United States Patent
Seo et al.

[11] Patent Number: 6,130,281
[45] Date of Patent: Oct. 10, 2000

[54] POWDER COATING, METHOD FOR COATING SAME AND COATING FILM OBTAINED THEREFROM

[75] Inventors: Shinji Seo, Hirakata; Keiichi Hiromoto, Osaka, both of Japan

[73] Assignee: Nippon Paint Co., Ltd., Osaka, Japan

[21] Appl. No.: 08/923,560

[22] Filed: Sep. 4, 1997

[30] Foreign Application Priority Data

Sep. 5, 1996 [JP] Japan .................................. 8-257593
Dec. 16, 1996 [JP] Japan .................................. 8-353445

[51] Int. Cl.$^7$ .............................. C08J 5/10; C08K 3/26; C08L 31/06
[52] U.S. Cl. ........................................ 524/425; 524/497
[58] Field of Search ..................... 524/425, 497

[56] References Cited

U.S. PATENT DOCUMENTS 4,190,714 2/1980 Isaksen et al. .......................... 525/163
5,552,191 9/1996 Horinka et al. .......................... 427/475

FOREIGN PATENT DOCUMENTS 0536791 4/1993 European Pat. Off. .

*Primary Examiner*—James J. Seidleck
*Assistant Examiner*—U. K. Rajguru
*Attorney, Agent, or Firm*—Leydig, Voit & Mayer, Ltd.

[57] ABSTRACT

A powder coating comprising a powder material comprising a film-forming resin as a main component, said powder material having a volume average particle size of not more than 30 μm and containing particles having a particle size which is not more than one-fifth of said volume average particle size, in a proportion of not more than 5 wt %. When the powder material is charged by corona discharge method or frictional electrification method, sprayed on a coating object to allow electrostatic adhesion and heated, a coating film can be obtained which has a uniform thickness on a coating object having a complicated shape including non-planar parts.

7 Claims, 2 Drawing Sheets

POWDER COATING, METHOD FOR COATING SAME AND COATING FILM OBTAINED THEREFROM

TECHNICAL FIELD OF THE INVENTION

The present invention relates to a powder coating, a method for coating same and a coating film obtained therefrom.

BACKGROUND OF THE INVENTION

A powder coating has been drawing much attention as a coating fit for the recent preference for pollution-free and resource-saving production, since it can form a coating film without using an organic solvent. Thus, the amount used of the power coating has been on a marked increase, and the field of its use has been rapidly widening.

Such powder coating is generally made from a powder material containing a film-forming resin as a main component, and typically applied to a coating object by an electrostatic powder coating method. The electrostatic powder coating method comprises charging a powder coating by a corona charge method or a frictional electrification method, spraying said powder coating on an earthed coating object to allow electrostatic adhesion of the powder coating, and heating-melting same to form a coating film.

In the above-mentioned electrostatic powder coating method, it is required to uniformly adhere the charged powder coating to the entire coating object, so that a coating film having a uniform thickness can be formed thereon. When the object has complicated non-planar parts (e.g., concave part and convex part), such as a box or an object having a folded part, however, the powder coating does not penetrate into the non-planar part easily, so that the amount of the powder coating adhered to the non-planar surface tends to be less than that adhered to other planar surfaces. Therefore, a coating film formed on the entire object cannot have a uniform thickness, because of the smaller film thickness of the non-planar part as compared to that of other parts. In particular, when a powder coating is charged by a corona charge method, Faraday cage effect prevents the powder coating from adhering to the non-planar surfaces, so that the thickness of the coating film formed on the object tends to be non-uniform. On the other hand, when the powder coating is charged by a frictional electrification method, the transfer efficiency and throwing power of the powder coating can be improved more than when a corona charge method is used, though only with regard to certain coating objects, such as net type objects and miniaturized parts having complicated shapes. When the coating object has a three dimensional structure having more planar parts such as corrugated sheet and box, the powder coating does not adhere to the non-planar surface easily, and the coating film tends to have non-uniform film thickness, as in the case of the corona charge method.

It is therefore an object of the present invention to provide a powder coating capable of forming a coating film having a uniform thickness even on a coating object having complicated shape inclusive of non-planar parts, a method for coating same and a coating film obtained therefrom.

SUMMARY OF THE INVENTION

The present invention provides the following.
(1) A powder coating comprising a powder material comprising a film-forming resin as a main component, said powder material having a volume average particle size of not more than 30 $\mu$m and containing particles having a particle size which is not more than one-fifth of said volume average particle size, in a proportion of not more than 5 wt %.
(2) The powder coating of (1) above, wherein the powder material has a volume average particle size of 5–30 $\mu$m.
(3) The powder coating of (1) above, wherein the powder material contains particles having a particle size which is not more than one-fifth of the volume average particle size, in a proportion of not more than 5 wt %, and particles having a particle size which is not less than 3 times the volume average particle size, in a proportion of not more than 5 wt %.
(4) The powder coating of (1) above, wherein the powder material has a dielectric constant of 2.0–6.0.
(5) The powder coating of (1) above, wherein the powder material has a volume specific resistance of not less than $1\times10^{14}\Omega\cdot$cm when 100 V voltage is applied.
(6) The powder coating of (1) above, wherein the powder material comprises a charge control agent to facilitate frictional electrification.
(7) The powder coating of (1) above, wherein the powder material is charged with –0.5 $\mu$C/g to –3.0 $\mu$C/g by a corona discharge treatment.
(8) The powder coating of (1) above, wherein the powder material has an internally generated current of 1.0–8.0 $\mu$A upon a frictional charge treatment.
(9) A coating method comprising charging the powder coating of any one of the above (1) to (8), spraying said powder coating to a coating object to allow electrostatic adhesion, and heating said powder coating.
(10) The coating method of (9) above, wherein the object has a non-planar part.
(11) The coating method of (9) above, wherein the powder coating is charged by a corona charge method.
(12) The coating method of (9) above, wherein the powder coating is charged by frictional electrification.
(13) A coating film obtained by the method of any one of the above (9) to (12).

DETAILED DESCRIPTION OF THE INVENTION

Powder Coating

Figure 1:
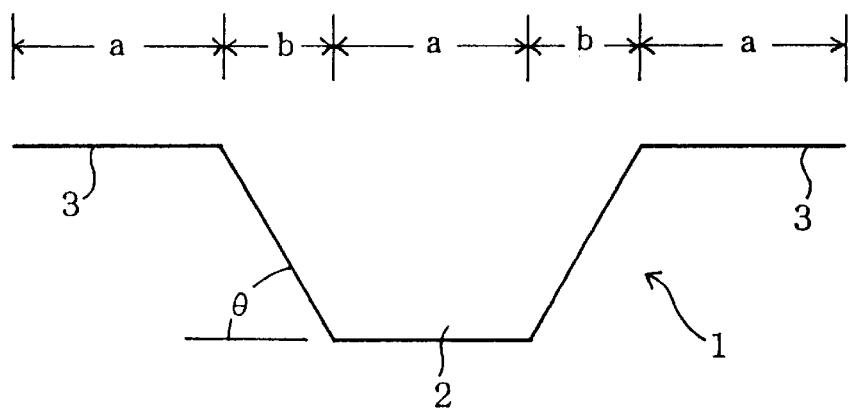
FIG. 1 is a bottom view of the substrate used for coating test in Examples, wherein 1 shows a substrate, 2 shows a concave part and 3 shows a flange.

The powder coating of the present invention comprises a powder material containing a film-forming resin as a main component. By powder material is meant a collection of particles. In the present invention, it includes a collection of particle complexes wherein fine particles have adhered on the particles. The film-forming resin to be used here is generally suitable for an electrostatic powder coating, namely, a thermosetting resin. Preferable thermosetting resin is solid at room temperature, which is specifically exemplified by epoxy resin, epoxy-polyester resin, polyester resin, acrylic resin, acryl-polyester resin, fluororesin and the like. Of these, an acrylic resin is preferably used when a coating film having superior weatherability is desired; a polyester resin is preferably used when a coating film having superior coating film properties, such as impact resistance, is desired; and an epoxy resin is preferably used when a coating film having superior corrosion resistance is desired.

Examples of acrylic resin include those obtained by polymerization of monomers such as styrene, acrylic acid, methyl acrylate, ethyl acrylate, n-butyl acrylate, isobutyl acrylate, tert-butyl acrylate, glycidyl acrylate, glycidyl methacrylate and 2-methylglycidyl methacrylate, by a conventional method.

Examples of polyester resin include those obtained by polymerization of polyhydric alcohol (e.g., ethylene glycol, propanediol, pentanediol, hexanediol, neopentyl glycol, trimethylol propane and pentaerythritol) and polycarboxylic acid (e.g. maleic acid, terephthalic acid, isophthalic acid, phthalic acid, succinic acid, glutalic acid, adipic acid and sebacic acid) by a conventional method.

The epoxy resin is exemplified by a compound having two or more oxirane groups in a molecule, which is specifically a glycidyl ester resin; glycidyl ether resin such as a condensation product of bisphenol A with epichlorohydrin and a condensation product of bisphenol F with epichlorohydrin; alicyclic epoxy resin; linear aliphatic epoxy resin; bromine-containing epoxy resin; phenol novolac type epoxy resin; cresol novolac type epoxy resin; and the like.

Examples of fluororesin include those obtained by polymerizing a monomer having at least one fluorine atom, and styrene, acrylic monomer and the like, by a conventional method.

As the epoxy-polyester resin, polyester resin having a carboxyl group and the above-mentioned epoxy resin are used, which are added to a powder material in such amounts that make the two resins respectively main binders.

Examples of epoxy-acrylic resin include acrylic resin having a carboxyl group and the above-mentioned epoxy resin, which are added to a powder material in such amounts that make the two resins respectively main binders.

When a thermosetting resin is used as the above-mentioned film-forming resin, a curing agent is concurrently used. The curing agent to be used may be a known one according to the functional group possessed by the thermosetting resin to be used. Examples thereof include block isocyanate, aliphatic polycarboxylic acid such as sebacic acid, aliphatic anhydride, aminoplast resin, epoxy resin, triglycidyl isocyanate, polyamide curing agent, hydroxyalkylamide (e.g. PRIMID XL552, trademark, manufactured by Rohm and Haas Company), glycolyl cure agent (e.g., POWDERLINK 1174, trademark, manufactured by CYTEC INDUSTRIES INC.), amine curing agent, triglycidyl isocyanulate, dicyanediamide, phenol resin, imidazols and imidazolines.

As the film-forming resin, a thermoplastic resin generally used in fluidized immersing method may be used as necessary, in addition to the above-mentioned thermosetting resin. Examples of the thermoplastic resin include polyvinyl chloride resin, polyethylene resin, polyamide resin, fluororesin, modified polyolefin resin and the like.

The above-mentioned various film-forming resins may be used alone or in combination.

The powder material constituting the powder coating of the present invention may comprise various additives as necessary, such as color pigments (e.g., titanium dioxide, iron oxide red, iron oxide, carbon black, phthalocyanine blue, phthalocyanine green, quinacridone pigment and azo pigment); extender pigment (e.g., talc, silica, calcium carbonate and precipitated barium sulfate); surface adjusting agent such as silicones (e.g., dimethyl silicone and methyl silicone) and acryl oligomer; foam inhibitor represented by benzoins (e.g., benzoin and benzoin derivatives having 1–3 kinds of functional groups); curing promoter (or curing catalyst); plasticizer; charge inhibitor; ultraviolet absorber; antioxidant; pigment dispersing agent; flame retardants; fluidizing agent; and the like.

The fluidizing agent is exemplified by "AEROSIL 130", "AEROSIL 200", "AEROSIL 300", "AEROSIL R-972", "AEROSIL R-812", "AEROSIL R-812S", "Titanium Dioxide T-805", "Titanium Dioxide P-25" and "Alminium Oxide C", all being trademarks, manufactured by NIPPON AEROSIL CO., LTD.; "CARPLEX FPS-1" (trademark, manufactured by Shionogi & Co., Ltd.) and the like.

When the powder coating of the present invention is charged by frictional electrification for coating, the powder material constituting the powder coating of the present invention preferably contains a charge control agent to facilitate frictional electrification. Examples of the charge control agent include finely-divided inorganic particles of aluminum oxide, finely-divided organic particles of nitrogen compound and the like. For efficient improvement of charge characteristic and powder fluidity, finely-divided particles of aluminum oxide are preferably used.

The amount of charge control agent to be added is preferably 0.03–1.0 wt %, more preferably 0.1–0.5 wt %, of the powder material. When the amount of the charge control agent is less than 0.03 wt %, the powder coating may not be sufficiently charged by frictional electrification, which in turn often results in lower transfer efficiency of the powder coating. Conversely, when it exceeds 1.0 wt %, the powder coating is charged too much by frictional electrification to result in a propensity toward easy saturation of electrification on the coating object, which in turn often results in lower transfer efficiency of the powder coating.

The powder material constituting the powder coating of the present invention has a volume average particle size of not more than 30 $\mu$m, preferably 5–30 $\mu$m, more preferably 8–25 $\mu$m. When the volume average particle size exceeds 30 $\mu$m, the easiness for the powder coating to enter non-planar parts of the coating object, for example, concave parts (hereinafter the easiness is also referred to as degree of penetration) decreases, so that a coating film having uniform thickness cannot be formed over the entire surface of the object. In addition, it often happens that the obtained coating film has poor appearance. When the volume average particle size is less than 5 $\mu$m, the production process may become complicated, and the transfer efficiency of the powder coating may decrease.

The powder material constituting the powder coating is set to contain particles having a particle size of not more than one-fifth of the above-mentioned volume average particle size in a proportion of not more than 5 wt %, preferably not more than 3 wt %. When the particles having a particle size of not more than one-fifth of the volume average particle size are contained in a proportion exceeding 5 wt %, the powder coating comes to have a lower degree of penetration into non-planar parts, thus failing to form a film having a uniform thickness on the entire coating object. In addition, the powder material is set to contain particles having a particle size of not less than 3 times the volume average particle size, in a proportion of not more than 5 wt %, preferably not more than 3 wt %. When the particles having a particle size of not less than 3 times the volume average particle size are contained in a proportion exceeding 5 wt %, the transfer efficiency of the powder coating and appearance of the obtained coating film may be degraded.

In the present invention, the volume average particle size and particle size distribution were determined using a particle size analyzer (MICROTRAC HRA X-100, trademark, manufactured by NIKKISO CO., LTD.).

For the determinations, MICROTRAC D.H.S. X100 Data Handling System SD-9300PRO-100, trademark, manufactured by NIKKISO CO., LTD., was used upon selection of reflect for particle transparency. The test sample was prepared by charging 50 g of 0.1% aqueous solution of surfactant and 0.5 g of various powder coatings in a sample bottle and immersing the sample botttle in water for 3 minutes while the water was under ultrasonic vibration by SILENT-SONIC UT-105, trademark, manufactured by Sharp Corporation, to give an aqueous powder coating dispersion.

The powder material constituting the above-mentioned powder coating has a dielectric constant preferably set to 2.0–6.0, more preferably 2.0–5.0. When the dielectric constant is less than 2.0, the transfer efficiency of the powder coating may decrease. Conversely, when the dielectric constant exceeds 6.0, the powder coating may have lower degree of penetration into non-planar parts, to the extent that a coating film having a uniform thickness cannot be formed on the whole coating object.

The dielectric constant here was determined as in the following. First, a powder coating (1.0 g) was pressed at a pressure of 300 kg/cm$^2$ for one minute to give pellets having a diameter of 2.0 cm. Then, the obtained pellets were left standing in an environment of temperature 25° C. and humidity 50% for 24 hours, and the dielectric constant was determined using a dielectric constant measurement device.

The powder material constituting the above-mentioned powder coating has a volume specific resistance of preferably not less than $1\times10^{14}$ Ω·cm, more preferably $1\times10^{14}$–$1\times10^{16}$ Ω·cm upon application of 100 V voltage. When the volume specific resistance is less than $1\times10^{14}$ Ω·cm, the particles constituting the powder material easily lose charge, as a result of which the powder coating easily comes off from the coating object. In addition, the charged particles constituting the powder material may be discharged before adhesion to the coating object, as a result of which the transfer efficiency of the powder coating becomes low. When the volume specific resistance exceeds $1\times10^{16}$ Ω·cm, the powder coating may have lower degree of penetration into non-planar parts. In addition, the charge may be accumulated in the layer of the powder coating formed on the coating object. In consequence, the particle layer of the powder coating discharges to form a crater like trace in this layer, which in turn degrades the appearance of the coating film after baking.

The volume specific resistance here is a resistance determined using a resistance measuring device after leaving the pellets, which have been prepared in the same manner as in the above-mentioned determination of the dielectric constant, for 24 hours in the determination environment of temperature 25° C. and humidity 50%.

The above-mentioned dielectric constant and the volume specific resistance can be easily set to the desired values by appropriately selecting the kind of the above-mentioned film-forming resin and various additives, or by appropriately adjusting the contents thereof.

The inventive powder coating can be prepared by a method conventionally used for producing a powder coating. To be specific, the above-mentioned film-forming resin and other additives are mixed at predetermined proportions, and the obtained mixture is melt-kneaded, cooled and roughly pulverized. The pulverized bulky particles thus obtained are further pulverized, and finely-divided particles, preferably bulky particles, too, are removed using a classifier to set the volume average particle size and particle size distribution to fall within the above-mentioned ranges.

Coating Method

The powder coating of the present invention is applied to a coating object by an electrostatic powder coating method. The method for charging the powder coating includes, for example, corona charge method and frictional electrification method. When the corona charge method is employed, either an external charge method or internal charge method may be used.

The coating object on which a coating film is to be formed using the powder coating of the present invention is not subject to any particular limitation as long as a conventional powder coating can be applied. Inasmuch as the powder coating of the present invention is superior in the degree of penetration into non-planar parts, such as concave parts, it can afford a coating film having a uniform thickness on the entire coating object which may be a three dimensional structure having such non-planar parts. The three dimensional structure having non-planar parts here includes, for example, various structures having complicated shape of concave parts and convex parts. Specific examples include corrugated object, box, bag, rod, tube, column, prism, cone, pyramid, panel having irregular patterns, slitted panel, punched panel, net, spherical objects, semi-spherical objects, propeller objects, louver, curved box, curved panel, perforated block (e.g., engine block), rails of sash window, hood-shaped objects, fuel tank of motorcycle, automobile wheel and the like.

In particular, the powder coating of the present invention shows fine degree of penetration into a concave part having a depth of about 2–100 cm, the ratio of width/depth of opening of about 1/50–50/1, and can be advantageously used for a coating object having such a concave part.

When the powder coating of the present invention is applied by an electrostatic powder coating method, the coating object is generally earthed, and the powder coating is sprayed on this object using a corona charge type coating gun or a frictional electrification type coating gun. The amount of the powder coating to be discharged from the coating gun is preferably 50–300 g/min. The distance from the tip of the coating gun to the coating object is preferably 100–300 mm, in consideration of the transfer efficiency.

When the powder coating of the present invention is discharged from a corona charge type coating gun for coating, the voltage to be applied to the powder material constituting the powder coating by corona discharge is preferably −30-−150 kv (preferably −50-−90 kv), and the powder material is preferably set to be charged with −0.5-−3.0 μC/g (preferably −0.5-−2.0 μC/g). When the charge amount is less than −0.5 μC/g, the powder coating may not easily adhere to the coating object to result in lower transfer efficiency. Conversely, when the charge amount is greater than −3.0 μC/g, an average charge amount per one particle constituting the powder material becomes greater, so that the powder coating comes to have less degree of penetration into non-planar parts (specifically concave parts) of the coating object, due to the Faraday cage effect, which in turn may lead to difficulty in forming a coating film having a uniform thickness on the entire coating object having non-planar parts (specifically concave parts).

The charge amount here can be determined as in the following. That is, the powder coating discharged from a corona charge type coating gun is collected using a Faraday cup, and the charge amount (Q) of the collected powder coating is determined using a digital electrometer. Then, the amount (M) of the powder coating collected by the Faraday cup is measured. The charge amount (Q) is divided by the powder coating amount (M), i.e., (Q/M), and the obtained value is taken as a charge amount.

On the other hand, when the powder coating of the present invention is discharged from a frictional electrification type coating gun for coating, frictional electrification is preferably applied such that the internally generated current of the powder material becomes 1.0–8.0 µA. When the internally generated current is less than 1.0 µA, the powder coating may not easily adhere to the coating object to result in lower transfer efficiency. Conversely, when the internally generated current exceeds 8.0 µA, an average charge amount per one particle constituting the powder material becomes too great, so that the powder coating comes to have less degree of penetration into non-planar parts (specifically concave parts) of the coating object, due to the Faraday cage effect, which in turn may lead to difficulty in forming a coating film having a uniform thickness on the entire coating object having non-planar parts.

The internally generated current here is the value read from the ammeter of a frictional electrification type coating gun, which indicates internally generated current when an electrostatic powder coating is applied using the frictional electrification type coating gun.

The powder coating of the present invention discharged from the coating gun toward the coating object as mentioned above electrostatically adheres to the coating object to form a particle layer of the powder coating on the coating object. Inasmuch as the powder coating has the above-mentioned particular volume average particle size and particle size distribution, it easily penetrates into the non-planar parts (e.g. concave part) of the coating object and easily adheres to non-planar surfaces as does to other planar surfaces. Accordingly, the powder coating of the present invention, when applied to a coating object, with regard to which the use of a conventional powder coating results in low degree of penetration into non-planar parts due to Faraday cage effect and a coating film having a uniform thickness cannot be formed with ease, can adhere to the entire surface of such a coating object in a uniform thickness.

The powder coating of the present invention applied to the coating object as described above can form a coating film through melting and curing upon application of heat. In-sodoing, since the powder coating adheres to the non-planar parts of the coating object, too, as described above, the coating object can have a coating film in a uniform thickness throughout, inclusive of non-planar parts.

The present invention is described in more detail by way of Examples, which should not be construed as limiting the invention.

EXAMPLE 1

Production of Polyester Powder Coating

A polyester resin (60 parts by weight, FINEDIC M8021, trademark, manufactured by DAINIPPON INK AND CHEMICALS, INC.), ε-caprolactam block isocyanate (10 parts by weight, ADDUCT B-1530, trademark, manufactured by HÜLS AG), calcium carbonate (5 parts by weight), titanium dioxide (30 parts by weight) and surface adjusting agent (0.5 part by weight, CF-1056, trademark, manufactured by Toshiba Silicone Co., Ltd.) were mixed in SUPER MIXER, trademark, manufactured by NIHON SPINDLE MFG. CO., LTD. for about 3 minutes, and then meltkneaded in COKNEADER, trademark, manufactured by BUSS AG at about 100° C. The obtained melt-kneaded product was cooled at room temperature and pulverized roughly, followed by pulverization using ATOMIZER, trademark, manufactured by Fuji Paudal Co., Ltd., at the highest rotation rate of the rotor. The resulting powder material was classified using an air classifier (DS-2, trademark, manufactured by NIPPON PNEUMATIC MFG. CO., LTD.) to remove finely-divided particles and bulky particles, whereby a polyester powder coating was obtained which had a volume average particle size of 24 µm and which contained particles having a particle size of not more than one-fifth of the volume average particle size in a proportion of 1.7 wt % and particles having a particle size of not less than 3 times the volume average particle size in a proportion of 1.1 wt %. The volume average particle size and particle size distribution were determined using a particle size analyzer (MICROTRAC HRA X-100, trademark, manufactured by NIKKISO CO., LTD.), hereinafter the same in Examples and Comparative Examples.

Comparative Example 1

Production of Polyester Powder Coating

A melt-kneaded product obtained in the same manner as in Example 1 was cooled to room temperature, pulverized by ATOMIZER, trademark, manufactured by Fuji Paudal Co., Ltd., at the lowest rotation rate of the rotor, and passed through a 150 mesh sieve to remove bulky particles, whereby a polyester powder coating was obtained which had a volume average particle size of 39 µm and which contained particles having a particle size of not more than one-fifth of the volume average particle size in a proportion of 4.4 wt % and particles having a particle size of not less than 3 times the volume average particle size in a proportion of 0.4 wt %.

EXAMPLE 2

Production of Polyester Powder Coating

A melt-kneaded product obtained in the same manner as in Example 1 was cooled to room temperature, pulverized by ATOMIZER, trademark, manufactured by Fuji Paudal Co., Ltd., and only finely-divided particles were removed using an air classifier (DS-2, trademark, manufactured by NIPPON PNEUMATIC MFG. CO., LTD.), whereby a polyester powder coating was obtained which had a volume average particle size of 29 µm and which contained particles having a particle size of not more than one-fifth of the volume average particle size in a proportion of 1.3 wt % and particles having a particle size of not less than 3 times the volume average particle size in a proportion of 7.1 wt %.

Comparative Example 2

Production of Polyester Powder Coating

A melt-kneaded product obtained in the same manner as in Example 1 was cooled to room temperature, pulverized by ATOMIZER, trademark, manufactured by Fuji Paudal Co., Ltd., at the highest rotation rate of the rotor, and passed through a 150 mesh sieve to remove bulky particles, whereby a polyester powder coating was obtained which had a volume average particle size of 24 µm and which contained particles having a particle size of not more than one-fifth of the volume average particle size in a proportion of 6.7 wt % and particles having a particle size of not less than 3 times the volume average particle size in a proportion of 1.5 wt %.

EXAMPLE 3

Production of Polyester Powder Coating

In the same manner as in Example 1 except that a material further comprising 2 parts by weight of secondary sodium alkanesulfonate was used, a polyester powder coating was obtained which had a volume average particle size of 25 μm and which contained particles having a particle size of not more than one-fifth of the volume average particle size in a proportion of 1.8 wt % and particles having a particle size of not less than 3 times the volume average particle size in a proportion of 2.1 wt %.

EXAMPLE 4

Production of Polyester Powder Coating

In the same manner as in Example 1 except that a material further comprising 20 parts by weight of calcium carbonate, 5 parts by weight of titanium dioxide and 2 parts by weight of copper phthalocyanine blue was used, a polyester powder coating was obtained which had a volume average particle size of 24 μm and which contained particles having a particle size of not more than one-fifth of the volume average particle size in a proportion of 2.3 wt % and particles having a particle size of not less than 3 times the volume average particle size in a proportion of 0.9 wt %.

EXAMPLE 5

Production of Epoxy Powder Coating

In the same manner as in Example 1 except that an epoxy resin (65 parts by weight, Epikote 1004, trademark, manufactured by YUKA SHELL EPOXY KABUSHIKI KAISHA), dicyanediamide (5 parts by weight), titanium dioxide (20 parts by weight), calcium carbonate (5 parts by weight) and surface adjusting agent (0.5 part by weight, CF-1056, trademark, manufactured by Toshiba Silicone Co., Ltd.) were used as the starting material, an epoxy powder coating was obtained which had a volume average particle size of 26 μm and which contained particles having a particle size of not more than one-fifth of the volume average particle size in a proportion of 1.2 wt % and particles having a particle size of not less than 3 times the volume average particle size in a proportion of 2.3 wt %.

EXAMPLE 6

Production of Acrylic Powder Coating

Xylene (63 parts by weight) was charged in a reaction vessel equipped with a thermometer, a stirrer, a condenser, a nitrogen inlet tube and a dropping funnel, and heated to 130° C. Into this reaction vessel were added dropwise a monomer mixture of glycidyl methacrylate (45 parts by weight), styrene (20 parts by weight), methyl methacrylate (27 parts by weight) and isobutyl methacrylate (8 parts by weight), and an initiator solution containing t-butyl peroxy-2-ethylhexanoate (6.5 parts by weight) and xylene (6 parts by weight) over 3 hours, each using the dropping funnel. After the dropwise addition, the mixture was thermally insulated at 130° C. for 30 minutes. Then, t-butyl peroxy-2-ethylhexanoate (0.1 part by weight) and xylene (7 parts by weight) were dropwise added through the dropping funnel. After the dropwise addition, the mixture was thermally insulated at 130° C. for one hour, and xylene was removed by distillation under reduced pressure, whereby an acrylic resin having a glass transition temperature of 52° C. was obtained.

The obtained acrylic resin (48 parts by weight), decanedicarboxylic acid (12 parts by weight), titanium dioxide (10 parts by weight), calcium carbonate (5 parts by weight), surface adjusting agent (0.1 part by weight, CF-1056, trademark, manufactured by Toshiba Silicone Co., Ltd.), benzoin (0.3 part by weight) and bisphenol A type epoxy resin (2.2 parts by weight, YD-012, trademark, manufactured by TOHTO CHEMICAL CO., LTD.) were mixed in SUPER MIXER, trademark, manufactured by NIHON SPINDLE MFG. CO., LTD. for about 3 minutes, and melt-kneaded in COKNEADER, trademark, manufactured by BUSS AG at 100° C. The obtained melt-kneaded product was cooled to room temperature and roughly pulverized, which was followed by pulverization using JET MILL IDS-2 type, trademark, manufactured by NIPPON PNEUMATIC MFG. CO., LTD. and classification using an air classifier (DS-2, trademark, manufactured by NIPPON PNEUMATIC MFG. CO., LTD.), whereby an acrylic powder coating was obtained which had a volume average particle size of 9.6 μm and which contained particles having a particle size of not more than one-fifth of the volume average particle size in a proportion of 0.5 wt % and particles having a particle size of not less than 3 times the volume average particle size in a proportion of 0.4 wt %.

EXAMPLE 7

Production of Acrylic Powder Coating

In the same manner as in Example 6 except that the conditions for pulverization and classification were modified, an acrylic powder coating was obtained which had a volume average particle size of 4.6 μm and which contained particles having a particle size of not more than one-fifth of the volume average particle size in a proportion of 2.3 wt % and particles having a particle size of not less than 3 times the volume average particle size in a proportion of 1.1 wt %.

EXAMPLE 8

Production of Acrylic Powder Coating

In the same manner as in Example 6 except that acrylic resin (48 parts by weight), decanedicarboxylic acid (12 parts by weight), surface adjusting agent (0.1 part by weight, CF-1056, trademark, manufactured by Toshiba Silicone Co., Ltd.), benzoin (0.3 part by weight) and bisphenol A type epoxy resin (2.2 parts by weight, YD-012, trademark, manufactured by TOHTO CHEMICAL CO., LTD.) were used as a starting material, an acrylic powder coating was obtained which had a volume average particle size of 9.7 μm and which contained particles having a particle size of not more than one-fifth of the volume average particle size in a proportion of 0.5 wt % and particles having a particle size of not less than 3 times the volume average particle size in a proportion of 0.7 wt %.

EXAMPLE 9

Production of Polyester Powder Coating

A polyester resin (60 parts by weight, FINEDIC M8021, trademark, manufactured by DAINIPPON INK AND CHEMICALS, INC.), ε-caprolactam block isocyanate (10 parts by weight, ADDUCT B-1530, trademark, manufactured by HULS AG), calcium carbonate (5 parts by weight), titanium dioxide (30 parts by weight) and surface adjusting agent (0.5 part by weight, CF-1056, trademark, manufactured by Toshiba Silicone Co., Ltd.) were mixed in SUPER MIXER, trademark, manufactured by NIHON SPINDLE MFG. CO., LTD. for about 3 minutes, and then melt-kneaded in COKNEADER, trademark, manufactured by BUSS AG at about 100° C. The obtained melt-kneaded product was cooled at room temperature and pulverized roughly, followed by pulverization using ATOMIZER, trademark, manufactured by Fuji Paudal Co., Ltd. The resulting powder material was classified using an air classifier (DS-2, trademark, manufactured by NIPPON PNEUMATIC MFG. CO., LTD.) to remove finely-divided particles and bulky particles. To the obtained powder material (100 parts by weight) was added a fine powder of aluminum oxide (0.2 part by weight, Aluminium Oxide C, trademark, manufactured by NIPPON AEROSIL CO., LTD.) as a charge control agent, and the mixture was mixed in SUPER MIXER, trademark, manufactured by NIHON SPINDLE MFG. CO., LTD. for about 1 minute, whereby a polyester powder coating was obtained which had a volume average particle size of 24 µm and which contained particles having a particle size of not more than one-fifth of the volume average particle size in a proportion of 2.0 wt % and particles having a particle size of not less than 3 times the volume average particle size in a proportion of 0.9 wt %.

Comparative Example 3

Production of Polyester Powder Coating

A melt-kneaded product obtained in the same manner as in Example 9 was cooled to room temperature, pulverized by ATOMIZER, trademark, manufactured by Fuji Paudal Co., Ltd., at the lowest rotation rate of the rotor, and passed through a 150 mesh sieve to remove bulky particles. To the obtained powder material (100 parts by weight) was added a fine powder of aluminum oxide (0.2 part by weight, Aluminium Oxide C, trademark, manufactured by NIPPON AEROSIL CO., LTD.) as a charge control agent, and the mixture was mixed in SUPER MIXER, trademark, manufactured by NIHON SPINDLE MFG. CO., LTD. for about 1 minute, whereby a polyester powder coating was obtained which had a volume average particle size of 36 µm and which contained particles having a particle size of not more than one-fifth of the volume average particle size in a proportion of 4.5 wt % and particles having a particle size of not less than 3 times the volume average particle size in a proportion of 0.1 wt %.

EXAMPLE 10

Production of Polyester Powder Coating

A melt-kneaded product obtained in the same manner as in Example 9 was cooled to room temperature, pulverized by ATOMIZER, trademark, manufactured by Fuji Paudal Co., Ltd., and only finely-divided particles were removed using an air classifier (DS-2, trademark, manufactured by NIPPON PNEUMATIC MFG. CO., LTD.). To the obtained powder material (100 parts by weight) was added a fine powder of aluminum oxide (0.2 part by weight, Aluminium Oxide C, trademark, manufactured by NIPPON AEROSIL CO., LTD.) as a charge control agent, and the mixture was mixed in SUPER MIXER, trademark, manufactured by NIHON SPINDLE MFG. CO., LTD. for about 1 minute, whereby a polyester powder coating was obtained which had a volume average particle size of 28 µm and which contained particles having a particle size of not more than one-fifth of the volume average particle size in a proportion of 1.1 wt % and particles having a particle size of not less than 3 times the volume average particle size in a proportion of 6.8 wt %.

Comparative Example 4

Production of Polyester Powder Coating

A melt-kneaded product obtained in the same manner as in Example 9 was cooled to room temperature, pulverized by ATOMIZER, trademark, manufactured by Fuji Paudal Co., Ltd., at the highest rotation rate of the rotor, and passed through a 150 mesh sieve to remove only bulky particles. To the obtained powder material (100 parts by weight) was added a fine powder of aluminum oxide (0.2 part by weight, Aluminium Oxide C, trademark, manufactured by NIPPON AEROSIL CO., LTD.) as a charge control agent, and the mixture was mixed in SUPER MIXER, trademark, manufactured by NIHON SPINDLE MFG. CO., LTD. for about 1 minute, whereby a polyester powder coating was obtained which had a volume average particle size of 23 µm and which contained particles having a particle size of not more than one-fifth of the volume average particle size in a proportion of 7.3 wt % and particles having a particle size of not less than 3 times the volume average particle size in a proportion of 1.5 wt %.

EXAMPLE 11

Production of Polyester Powder Coating

In the same manner as in Example 9 except that a material further comprising 2 parts by weight of secondary sodium alkanesulfonate was used, a polyester powder coating was obtained which had a volume average particle size of 25 µm and which contained particles having a particle size of not more than one-fifth of the volume average particle size in a proportion of 1.8 wt % and particles having a particle size of not less than 3 times the volume average particle size in a proportion of 0.8 wt %.

EXAMPLE 12

Production of Polyester Powder Coating

In the same manner as in Example 9 except that a material further comprising 20 parts by weight of calcium carbonate, 5 parts by weight of titanium dioxide and 2 parts by weight of copper phthalocyanine blue was used, a polyester powder coating was obtained which had a volume average particle size of 24 µm and which contained particles having a particle size of not more than one-fifth of the volume average particle size in a proportion of 2.3 wt % and particles having a particle size of not less than 3 times the volume average particle size in a proportion of 0.9 wt %.

EXAMPLE 13

Production of Polyester Powder Coating

In the same manner as in Example 9 except that the amount of the fine powder of aluminum oxide (Aluminium Oxide C, trademark, manufactured by NIPPON AEROSIL CO., LTD.) was changed to 0.7 part by weight, a polyester powder coating was obtained which had a volume average particle size of 24 µm and which contained particles having a particle size of not more than one-fifth of the volume average particle size in a proportion of 2.0 wt % and particles having a particle size of not less than 3 times the volume average particle size in a proportion of 1.4 wt %.

EXAMPLE 14

Production of Polyester Powder Coating

In the same manner as in Example 9 except that the amount of the fine powder of aluminum oxide (Aluminium Oxide C, trademark, manufactured by NIPPON AEROSIL CO., LTD.) was changed to 0.05 part by weight, a polyester powder coating was obtained which had a volume average particle size of 24 μm and which contained particles having a particle size of not more than one-fifth of the volume average particle size in a proportion of 2.0 wt % and particles having a particle size of not less than 3 times the volume average particle size in a proportion of 1.0 wt %.

EXAMPLE 15

Production of Epoxy Powder Coating

In the same manner as in Example 9 except that an epoxy resin (65 parts by weight, Epikote 1004, trademark, manufactured by YUKA SHELL EPOXY KABUSHIKI KAISHA), dicyanediamide (5 parts by weight), titanium dioxide (20 parts by weight), calcium carbonate (5 parts by weight) and surface adjusting agent (0.5 part by weight, CF-1056, trademark, manufactured by Toshiba Silicone Co., Ltd.) were used as a starting material, an epoxy powder coating was obtained which had a volume average particle size of 24 μm and which contained particles having a particle size of not more than one-fifth of the volume average particle size in a proportion of 2.2 wt % and particles having a particle size of not less than 3 times the volume average particle size in a proportion of 2.0 wt %.

Coating Test

Figure 2:
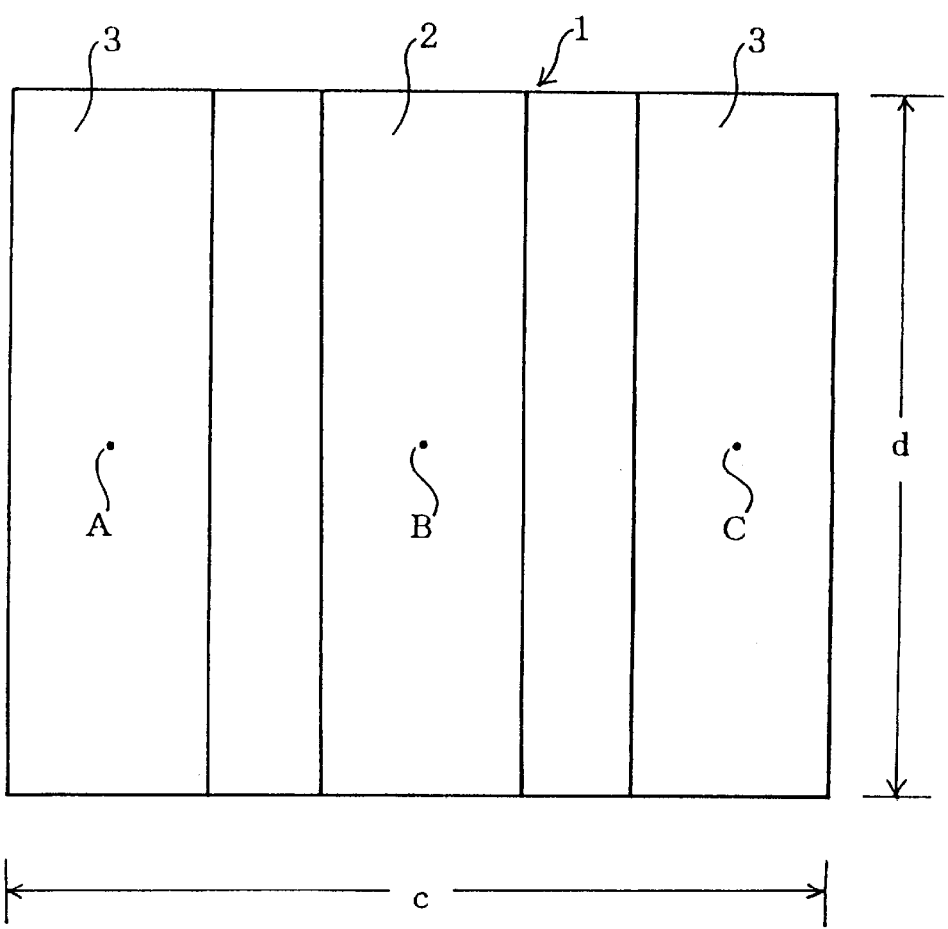
FIG. 2 is a front view of the substrate shown in FIG. 1.

As a coating object, a substrate 1 as shown in FIG. 1 (bottom view) and FIG. 2 (front view) was prepared, which comprised a concave part 2 in the center which extended in the direction of width and a flange 3 on both ends. The substrate 1 was a phosphoric acid-treated steel panel having a thickness of 0.8 mm and having the following size and angle at respective parts shown with the symbols a to d and θ in FIG. 1 and FIG. 2.

a=70 mm, b=40 mm, c=290 mm, d=600 mm, θ=60°

Figure 3:
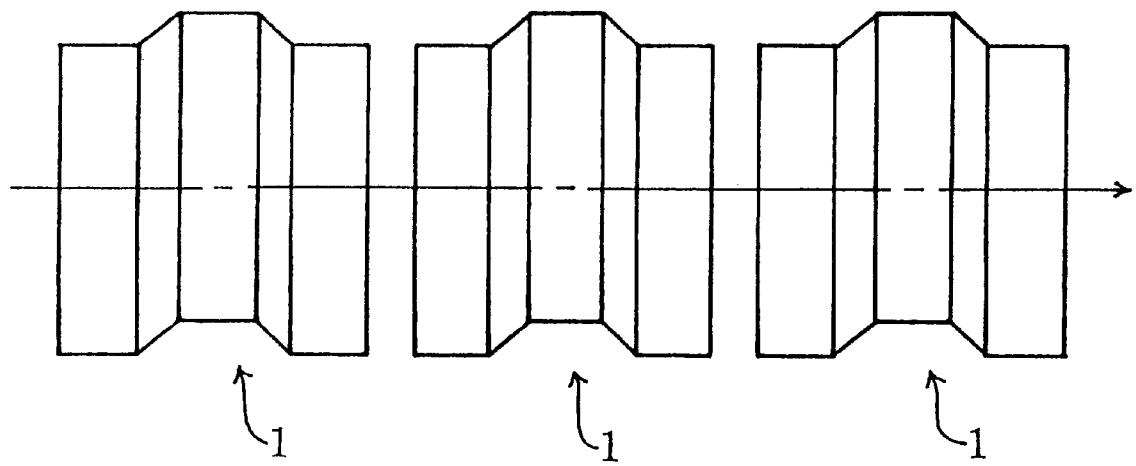
FIG. 3 is a perspective view showing the arrangement of the substrate of FIG. 1 when applying a powder coating thereto in examples.
Figure 4:
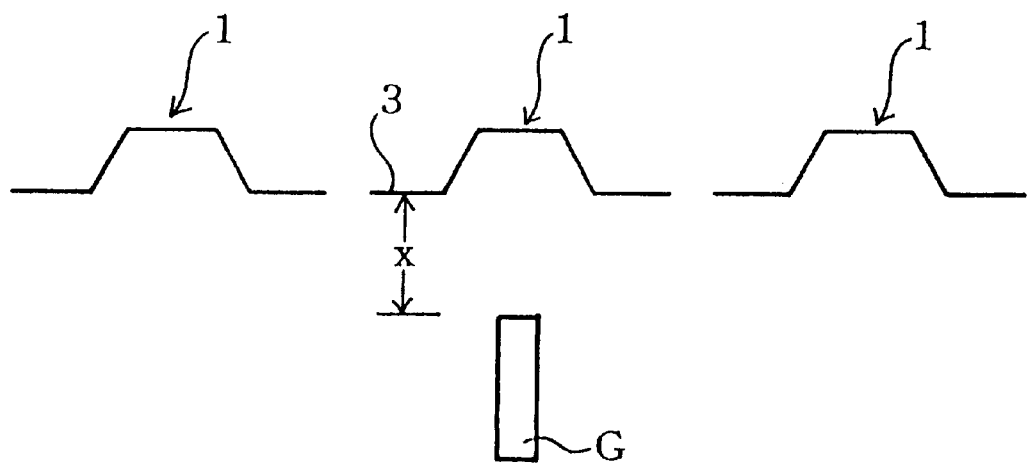
FIG. 4 schematically shows the positional relationship between the substrate shown in FIG. 3 and a coating gun G.

As shown in FIG. 3, three substrates 1 were hanged at 100 mm intervals relative to a horizontal displacement overhead conveyer (not shown). As shown in FIG. 4, a coating gun G was set in front of the substrate 1 such that, when the substrate 1 was moved by the horizontal displacement overhead conveyer, a spray pattern as shown in FIG. 3 with a dotted line was drawn. The distance x between the flange 3 of substrate 1 and the tip of the head of the coating gun G was 200 mm.

The coating gun G used in Examples 1–8 and Comparative Examples 1–2 was a corona charge type coating gun (PG-1, trademark, manufactured by GEMA) and that used in Examples 9–15 and Comparative Examples 3–4 was a frictional electrification type coating gun (SFC-TR100D, trademark, manufactured by MATUO SANGYO CO., LTD.).

Using the coating device set as above, the powder coating obtained in each Example and Comparative Example was coated on the substrate 1. The film thickness was 60±5 μm and the coating conditions were as follows.

Examples 1–8 and Comparative Examples 1–2 overhead conveyer transport speed: 1.8 m/min
voltage load: −80 kv
discharge amount: 100 g/min
discharge pressure: 1.0 kgf/cm$^2$
air flow: 4.5 m$^3$/h Examples 9–15 and Comparative Examples 3–4 overhead conveyer transport speed: 1.8 m/min
discharge amount: 100 g/min
discharge pressure: 2.0 kgf/cm$^2$
accelerating pressure: 2.0 kgf/cm$^2$ Then, the substrate 1 (the one positioned in the center) coated with the powder coating was baked in a hot air dryer furnace at 180° C. for 20 minutes to give a coating film. The obtained coating film was examined for appearance, transfer efficiency of powder coating and degree of penetration of the powder coating. The powder coating obtained in each Example and Comparative Example was examined for powder characteristics (dielectric constant, volume specific resistance upon application of 100 V voltage and charge amount when discharged from the corona charge type coating gun in Examples 1–8 and Comparative Examples 1–2 or internally generated current when discharged from the frictional electrification type coating gun in Examples 9–15 and Comparative Examples 3–4).

The results are shown in Table 1 and Table 2. The methods therefor were as follows.

[Degree of Penetration]

The coated substrate 1 was measured for the thickness of coating film (each Ta, Tb and Tc) at the sites A, B and C in FIG. 2. The obtained film thickness at each site was inserted into the following formula (1) to give a degree of penetration. The greater values show more superior degrees of penetration.

$$\text{Degree of penetration} = Tb/((Ta+Tc)/2) \qquad (1)$$

When the powder coating was discharged from the corona charge type coating gun (Examples 1–8 and Comparative Examples 1–2), the degree of penetration was fine at the value of not less than 0.6; and when the powder coating was discharged from the frictional electrification type coating gun (Examples 9–15 and Comparative Examples 3–4), the degree of penetration was fine at the value of not less than 0.55.

[Appearance of Coating Film]

Ra value was measured using a surface roughness shape measuring device (Surfcom 470A, trademark, manufactured by Tokyo Seimitsu Co., Ltd.) and the appearance was evaluated based thereon.

[Transfer Efficiency]

The weight of the powder coating coated on the substrate 1 relative to the total amount of the powder coating discharged from the coating gun was calculated for evaluation. The greater values show more superior transfer efficiency.

[Powder Coating Characteristics]

The dielectric constant, volume specific resistance, charge amount (Examples 1–8 and Comparative Examples 1–2) and internally generated current (Examples 9–15 and Comparative Examples 3–4) were determined by the methods disclosed in the present specification. Used as a dielectric constant measurement device was TYPE AG-4311 LCR METER, trademark, manufactured by ANDO ELECTRIC CO., LTD., used as a resistance measurement device was TR8601, trademark, manufactured by TAKEDA RIKEN CO., LTD., and used as a charge amount measurement digital electrometer was TR-8652, trademark, manufactured by ADVANTEST CORPORATION. For the determination of the charge amount, the powder coating discharged from the corona charge type coating gun under the same conditions as in the above-mentioned coating method was collected by a Faraday cup.

TABLE 1

| | Examples | | | | | | | | Comparative Examples | |
|---|---|---|---|---|---|---|---|---|---|---|
| | 1 | 2 | 3 | 4 | 5 | 6 | 7 | 8 | 1 | 2 |
| resin | polyester | polyester | polyester | polyester | epoxy | acryl | acryl | acryl | polyester | polyester |
| volume average particle size ($\mu$m) | 24 | 29 | 25 | 24 | 26 | 9.6 | 4.6 | 9.7 | 39 | 24 |
| percentage of finely-divided particles (*1) | 1.7 | 1.3 | 1.8 | 2.3 | 1.2 | 0.5 | 2.3 | 0.5 | 4.4 | 6.7 |
| percentage of bulky particles (*2) | 1.1 | 7.1 | 2.1 | 0.9 | 2.3 | 0.4 | 1.1 | 0.7 | 0.4 | 1.5 |
| charge amount ($\mu$C/g) | -0.9 | -0.4 | -0.6 | -0.5 | -1.1 | -1.7 | -3.6 | -1.6 | -0.7 | -3.2 |
| volume specific resistance ($\Omega \cdot$ cm) | $1.1 \times 10^{15}$ | $1.3 \times 10^{15}$ | $4.7 \times 10^{12}$ | $1.4 \times 10^{15}$ | $2.7 \times 10^{15}$ | $4.2 \times 10^{15}$ | $4.1 \times 10^{15}$ | $2.3 \times 10^{17}$ | $1.2 \times 10^{15}$ | $1.2 \times 10^{15}$ |
| dielectric constant | 3.0 | 3.1 | 4.9 | 0.9 | 4.7 | 2.3 | 2.3 | 2.1 | 3.0 | 2.9 |
| degree of penetration | 0.83 | 0.80 | 0.71 | 0.88 | 0.79 | 0.93 | 0.95 | 0.69 | 0.52 | 0.59 |
| appearance of film (Ra) | 0.5 | 1.1 | 2.1 | 0.4 | 0.5 | 0.2 | 0.2 | 0.7 | 0.9 | 0.8 |
| transfer efficiency (%) | 73 | 58 | 34 | 47 | 83 | 69 | 51 | 65 | 75 | 74 |

Note
*1: proportion (% by volume) of particles having a particle size not more than ⅕ of volume average particle size
*2: proportion (% by volume) of particles having a particle size not more than 3 times the volume average particle size

TABLE 2

| | Examples | | | | | | | Comparative Examples | |
|---|---|---|---|---|---|---|---|---|---|
| | 9 | 10 | 11 | 12 | 13 | 14 | 15 | 3 | 4 |
| resin | polyester | polyester | polyester | polyester | polyester | polyester | epoxy | polyester | polyester |
| volume average particle size ($\mu$m) | 24 | 28 | 25 | 24 | 24 | 24 | 24 | 36 | 23 |
| percentage of finely-divided particles (*1) | 2.0 | 1.1 | 1.8 | 2.3 | 2.0 | 2.0 | 2.2 | 4.5 | 7.3 |
| percentage of bulky particles (*2) | 0.9 | 6.8 | 0.8 | 0.9 | 1.4 | 1.0 | 2.0 | 0.1 | 1.5 |
| internally generated current ($\mu$A) | 3.6 | 2.1 | 0.8 | 2.4 | 8.8 | 0.9 | 4.6 | 2.9 | 4.2 |
| volume specific resistance ($\Omega \cdot$ cm) | $1.1 \times 10^{15}$ | $1.2 \times 10^{15}$ | $4.7 \times 10^{12}$ | $1.3 \times 10^{15}$ | $1.1 \times 10^{15}$ | $1.1 \times 10^{15}$ | $2.9 \times 10^{15}$ | $1.2 \times 10^{15}$ | $1.1 \times 10^{15}$ |
| dielectric constant | 3.0 | 3.1 | 5.1 | 0.9 | 2.8 | 3.0 | 4.7 | 3.0 | 2.9 |
| degree of penetration | 0.63 | 0.62 | 0.56 | 0.69 | 0.55 | 0.66 | 0.60 | 0.41 | 0.44 |
| appearance of film (Ra) | 0.5 | 1.2 | 2.4 | 0.5 | 0.7 | 1.1 | 0.6 | 1.0 | 0.6 |
| transfer efficiency (%) | 58 | 45 | 21 | 40 | 52 | 34 | 64 | 59 | 57 |

Note
*1: proportion (% by volume) of particles having a particle size not more than ⅕ of volume average particle size
*2: proportion (% by volume) of particles having a particle size not less than 3 times the volume average particle size The powder coating of the present invention comprises a powder material having a volume average particle size of not more than 30 $\mu$m and contains particles having a particle size which is not more than one-fifth of the volume average particle size in a proportion of not more than 5 wt %. The powder coating shows superior degree of penetration into non-planar parts of the coating object, so that when the powder coating is charged, sprayed on a coating object to allow electrostatic adhesion, and heated, a coating film can be obtained which has a uniform thickness on the entire coating object having a complicated shape including non-planar parts.

When said powder material has a volume average particle size of 5–30 $\mu$m and contains particles having a particle size which is not more than one-fifth of the volume average particle size in a proportion of not more than 5 wt % and particles having a particle size which is not less than 3 times the volume average particle size in a proportion of not more than 5 wt %, the powder coating shows fine transfer efficiency, and a coating film having, in addition to the above-mentioned effects, good appearance can be obtained.

This application is based on application Nos. 257593/1996 and 353445/1996 filed in Japan, the contents of which are incorporated hereinto by reference.

What is claimed is:

1. A powder coating comprising a powder material comprising a film-forming resin as a main component, said powder material having a volume average particle size of 5–30 $\mu$m and containing particles having a particle size which is not more than one-fifth of said volume average particle size, in a proportion of not more than 5 wt %.

2. The powder coating of claim 1, wherein the powder material contains particles having a particle size which is not more than one-fifth of the volume average particle size, in a proportion of not more than 5 wt %, and particles having a particle size which is not less than 3 times the volume average particle size, in a proportion of not more than 5 wt %.

3. The powder coating of claim 1, wherein the powder material has a dielectric constant of 2.0–6.0.

4. The powder coating of claim 1, wherein the powder material has a volume specific resistance of not less than $1 \times 10^{14} \Omega \cdot$cm when 100 V voltage is applied.

5. The powder coating of claim 1, wherein the powder material comprises a charge control agent to facilitate frictional electrification.

6. The powder coating of claim 1, wherein the powder material is charged with –0.5 $\mu$C/g to –3.0 $\mu$C/g by a corona discharge treatment.

7. The powder coating of claim 1, wherein the powder material has an internally generated current of 1.0–8.0 $\mu$A upon a frictional electrification treatment.

* * * * *